US008880295B2

(12) United States Patent
Champagne et al.

(10) Patent No.: US 8,880,295 B2
(45) Date of Patent: Nov. 4, 2014

(54) TORQUE BASED END OF TRAVEL SOFT STOP

(75) Inventors: Anthony J. Champagne, Saginaw, MI (US); Lonnie Newton, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 292 days.

(21) Appl. No.: 13/298,798

(22) Filed: Nov. 17, 2011

(65) Prior Publication Data

US 2012/0232754 A1    Sep. 13, 2012

Related U.S. Application Data

(60) Provisional application No. 61/451,886, filed on Mar. 11, 2011.

(51) Int. Cl.
*B62D 6/00* (2006.01)
*B62D 5/04* (2006.01)

(52) U.S. Cl.
CPC ................. *B62D 5/0469* (2013.01)
USPC ............................................. 701/41; 701/44

(58) Field of Classification Search
USPC .................. 701/41–44; 180/422, 443, 444
See application file for complete search history.

(56) References Cited

U.S. PATENT DOCUMENTS

| 6,260,655 | B1 | 7/2001 | Mukai et al. |
| 6,408,235 | B1 | 6/2002 | Tanke, II et al. |
| 2005/0082107 | A1* | 4/2005 | Husain et al. .................. 180/402 |
| 2009/0187311 | A1 | 7/2009 | Christiansen et al. |
| 2010/0193272 | A1* | 8/2010 | Jacobsen et al. ............. 180/69.3 |
| 2011/0010049 | A1 | 1/2011 | Champagne |
| 2011/0010053 | A1* | 1/2011 | Champagne .................... 701/42 |
| 2011/0224876 | A1* | 9/2011 | Paholics et al. ................. 701/42 |
| 2011/0257866 | A1* | 10/2011 | Jacobsen et al. ............. 701/102 |

FOREIGN PATENT DOCUMENTS

| FR | 2850076 A1 | 7/2004 |
| WO | WO0120412 A1 | 3/2001 |

OTHER PUBLICATIONS

Extended European Search Report of Application No. EP 12159072.3, Torque Based End of Travel Soft Stop, Filing Date Mar. 12, 2012, Mailing date Jun. 14, 2012, 7 pages.

* cited by examiner

*Primary Examiner* — Jason Holloway
(74) *Attorney, Agent, or Firm* — Cantor Colburn LLP (57) ABSTRACT

A control system for controlling a steering system near an end of travel region is provided. The control system includes a first module that selectively estimates a command adjust value based on a hand wheel position and a hand wheel torque. A second module generates a motor assist command based on the command adjust value to control the steering system.

16 Claims, 8 Drawing Sheets

TORQUE BASED END OF TRAVEL SOFT STOP

CROSS-REFERENCES TO RELATED APPLICATIONS

This patent application claims priority to U.S. Provisional Patent Application Ser. No. 61/451,886 filed Mar. 11, 2011 which is incorporated herein by reference in its entirety.

INCORPORATION BY REFERENCE

This patent application is related to US Patent Publications 2011/0010053 and 2011/0010049, which are incorporated herein by reference in their entirety.

BACKGROUND OF THE INVENTION

The present disclosure relates to methods and system for controlling a steering system, and more particularly to methods and system for reducing end of travel harshness in a steering system.

The subjective impression of vehicle steering systems can be influenced by system behavior at the end of travel. A negative impression can occur if there is a harsh, abrupt feeling when steering into the corners. In some applications, a metal-on-metal clunk due to the steering rack end of travel hardware causes both audible and tactile annoyances.

In present applications, the end-of-travel feel is influenced primarily by the rack-and-pinion travel stop compliance. If a deficiency in the subjective impression is found at end-of-travel, cost and/or timing may prohibit finding a solution through changes to the rack and pinion travel stops.

Accordingly, it is desirable to provide systems and methods for reducing the end of travel harshness.

SUMMARY OF THE INVENTION

Accordingly, a control system for controlling a steering system near an end of travel region is provided. The control system includes a first module that selectively estimates a command adjust value based on hand wheel position and hand wheel torque. A second module generates a motor assist command based on the command adjust value to control the steering system.

In another embodiment a method of controlling a steering system near an end of travel region is provided. The method includes selectively estimating a command adjust value based on a hand wheel position and a hand wheel torque, and generating a motor assist command based on the command adjust value to control the steering system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following description is not intended to limit the present disclosure, application, or uses. It should be understood that throughout the drawings, corresponding reference numerals indicate like or corresponding parts and features.

Figure 1:
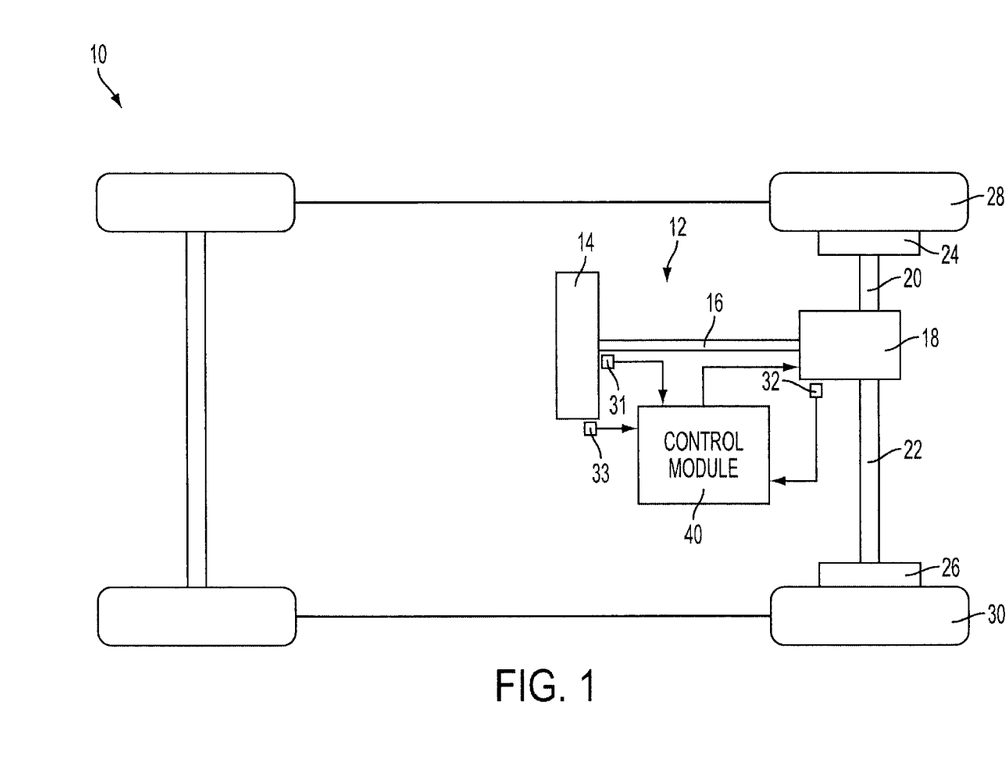
FIG. 1 is a functional block diagram illustrating a vehicle including a steering control system in accordance with an exemplary embodiment of the invention.

Referring now to the Figures, where the invention will be described with reference to various embodiments, without limiting same, a vehicle 10 is illustrated in FIG. 1 that includes a steering system 12. In various embodiments, the steering system 12 includes a hand wheel 14 coupled to a steering shaft 16. In one embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing. During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses the torque applied to the hand wheel 14 by the operator of the vehicle 10. The torque sensor generates a handwheel torque signal based thereon. In another example, the sensor 32 is a motor speed sensor that senses a rotational speed and direction of the motor of the steering assist unit 18. The sensor 32 generates a motor velocity signal based thereon. In yet another example, the sensor 33 is a hand wheel position sensor that senses a position of the hand wheel 14. The sensor 33 generates a hand wheel position signal based thereon.

A control module 40 controls the operation of the steering system 12 based on one or more of the sensor signals and further based on the steering control systems and methods of the present disclosure. Generally speaking, the steering control systems and methods of the present disclosure generate a final assist command to the motor of the steering assist unit 18 to control the end of travel harshness. In various embodiments, the steering control systems and methods apply a command adjust value such as a gain and/or a damping to the final assist command to reduce the end of travel harshness. The control module determines the command adjust value based on hand wheel position, hand wheel torque, or a combination thereof.

Figure 2:
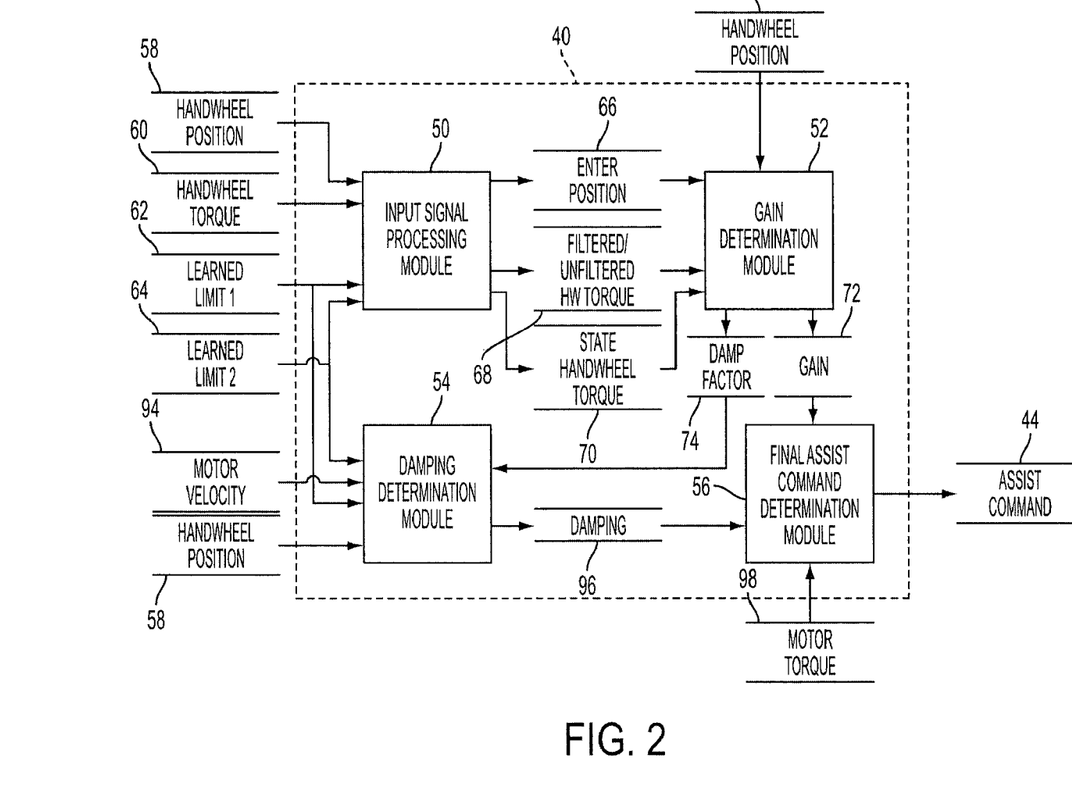
FIGS. 2 and 3 are dataflow diagrams illustrating a steering control system in accordance with other exemplary embodiments of the invention.

Referring now to FIG. 2, a dataflow diagram illustrates embodiments of the control module 40 of FIG. 1 used to control the steering system 12 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly generate a final assist command 44 to the steering system 12 (FIG. 1) to reduce the end of travel harshness.

In various embodiments, the control module 40 includes an input signal processing module 50, a gain determination module 52, a damping determination module 54, and a final assist command determination module 56. As can be appreciated, inputs to the control module 40 can be generated from the sensors 31, 32, 33 (FIG. 1) of the vehicle 10 (FIG. 1), can be received from other control modules (not shown) within the vehicle 10 (FIG. 1), can be modeled, and/or can be pre-defined.

The input signal processing module 50 receives as input hand wheel position 58, hand wheel torque 60, and learned end of travel (EOT) limits 62, 64. The input signal processing module 50 performs methods for conditioning of the angle and torque signals and generates an enter position 66, various conditioned torque values such as unfiltered and filtered handwheel torques 68, and a state hand wheel torque 70 (e.g., may also be filtered).

Figure 4:
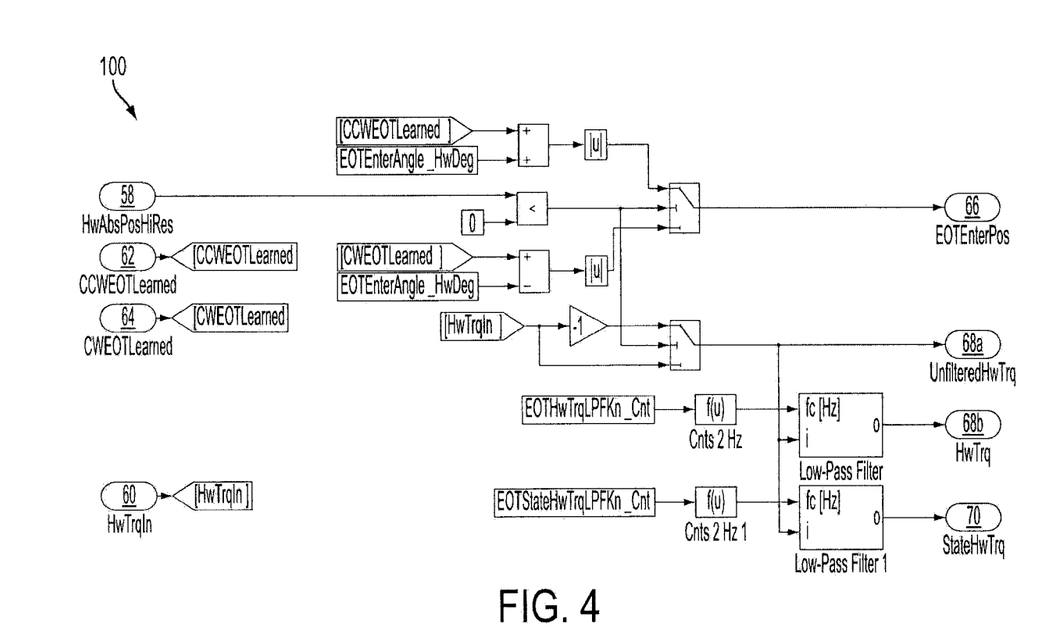
FIGS. 4-8 are models illustrating steering control methods and systems in accordance with yet other exemplary embodiments of the invention.

For example, exemplary embodiments of a method 100 that may be performed by the input signal processing module 50 is shown in FIG. 4. The measured hand wheel position 58 (HwAbsPosHiRes) is used to determine the enter position 66 (EOTEnterPos), which is the end of travel enter position. In this example, EOTEnterPos is based on the learned EOT limits 62, 64 (CCWEOTLearned and CWEOTLearned) and a predetermined enter angle (EOTEnterAngle). As can be appreciated, other methods may be employed to determine the enter position 66. Note that EOTEnterPos is positive-valued. The hand wheel torque 60 (HwTrqIn) is used as the basis for the remaining three outputs 68a, 68b, 70. Here, HwTrqIn 60 is inverted as necessary such that a positive torque signifies steering into the EOT region.

With reference back to FIG. 2, the gain determination module 52 receives as input the enter position 66, the hand wheel position 58, the hand wheel torque 68, and the state handwheel torque 70. Based on the inputs 58, 66, 68, 70, the gain determination module 52 performs methods for determining a gain 72 and a damping factor 74.

Figure 3:
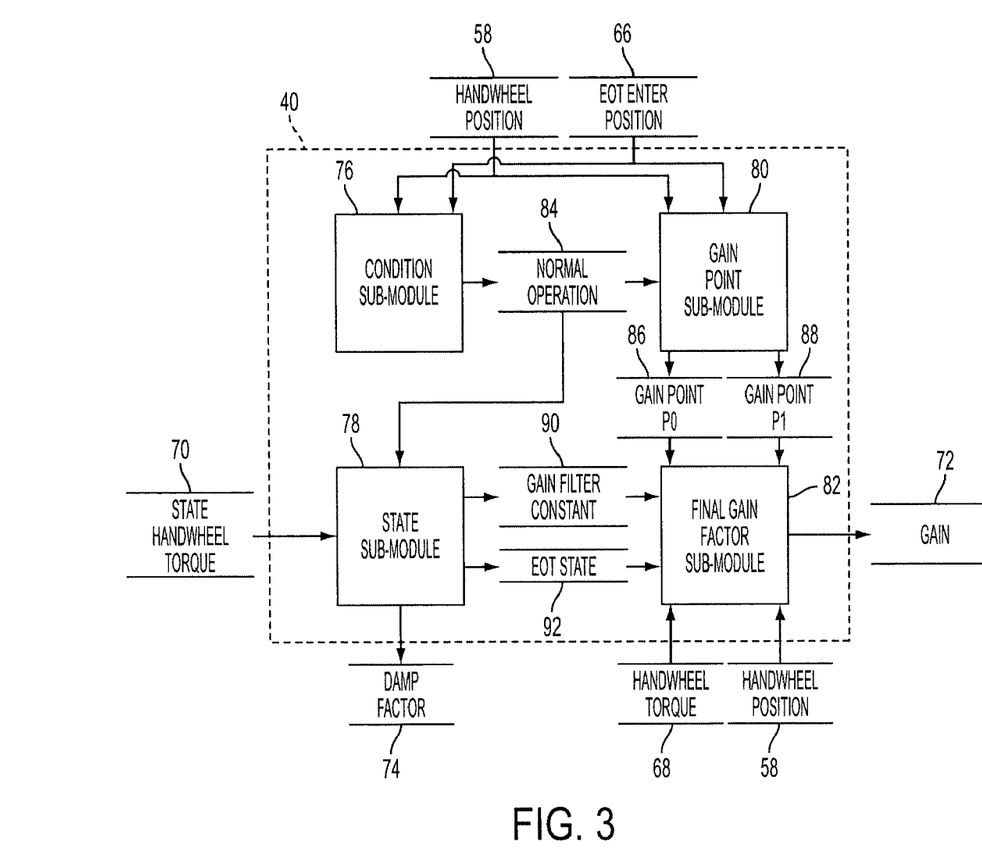

In various embodiments, in order to determine the gain 72 and the damping factor 74 the gain determination module 52 may be further partitioned into sub-modules. As shown in FIG. 3, the sub-modules may include a condition sub-module 76, a state sub-module 78, a gain point sub-module 80, and a final gain factor sub-module 82.

The condition sub-module 76 receives as input the handwheel position 58 and the enter position 66. Based on the inputs, the condition sub-module 76 determines whether the handwheel position 58 is within an electric power steering travel region and generates an operation flag 84 based thereon. For example, when the handwheel position 58 is less than or equal to the enter position 66, then the operation flag 84 is set to TRUE or one. Otherwise, the operation flag 84 is set to FALSE or zero.

The gain point module 80 receives as input the handwheel position 58, the enter position 66, and the operation flag 84. Based on the inputs 58, 66, 84, the gain point module 80 performs methods to determine a gain point P0 86, and a gain point P1 88.

Figure 5:
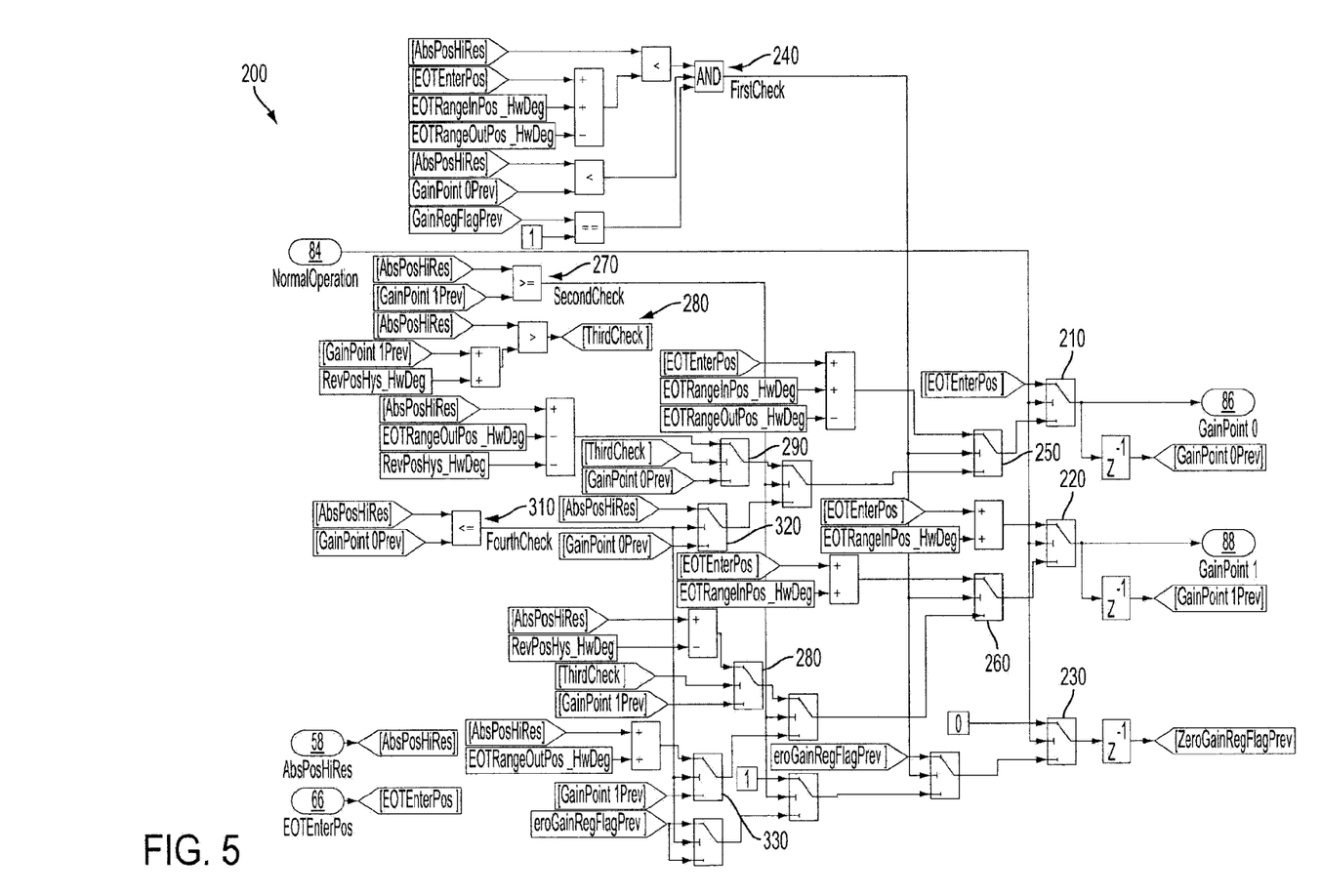

For example, an exemplary embodiment of a method 200 that may be performed by the gain point sub-module 80 is shown in FIG. 5. In FIG. 5, when the operation flag 84 (NormalOperation) is TRUE or one (i.e., not within the EOT region), the gain point P0 86 (GainPoint0) is reset to the enter position 66 (EOTEnterPos) at 210, and the gain point P1 88 (GainPoint1) is reset to the enter position plus a predetermined value (EOTEnterPos+EOTRangeInPos) at 220. An internal signal (ZeroGainRegFlagPrev) is reset to FALSE or zero at 230.

When the operation flag 84 (NormalOperation) is FALSE or zero, then the logic at 240 (FirstCheck) is performed. Exemplary conditions of FirstCheck are provided in Table 1.

TABLE 1

| OPERAND 1 | Condition | OPERAND 2 |
|---|---|---|
| AbsPosHiRes | Less than | EnterPos + EOTRangeInPos− EOTRangeOutPos |
| AbsPosHiRes | Less than | GainPoint0Prev |
| ZeroGainRegFlagPrev | Equals | one |

When FirstCheck is TRUE, GainPoint0 and GainPoint1 are set to (EOTEnterPos+EOTRangInPos−EOTRangeOutPos) and (EOTEnterPos+EOTRangInPos) at 250 and 260, respectively. When FirstCheck is FALSE, then the logic at 270 (SecondCheck) is performed. Exemplary conditions of SecondCheck are provided in Table 2.

TABLE 2

| OPERAND 1 | Condition | OPERAND 2 |
|---|---|---|
| AbsPosHiRes | Greater than or equal to | GainPoint1Prev |

When SecondCheck is TRUE, the ZeroGainRegFlagPrev is set to one; and the logic at 280 (ThirdCheck) is performed. Exemplary conditions of ThirdCheck are provided in Table 3.

TABLE 3

| OPERAND 1 | Condition | OPERAND 2 |
|---|---|---|
| AbsPosHiRes | Greater than | GainPoint0Prev + RevPosHys_HwDeg |

When ThirdCheck is TRUE, GainPoint0 and GainPoint1 are again updated to (AbsPosHiRes−EOTRangeOutPos−RevPosHys) and (AbsPosHiRes−RevPosHys) at 290 and 300, respectively. When ThirdCheck is FALSE, then the previous GainPoint values are re-used at 290 and 300, respectively.

When SecondCheck is FALSE, then logic at 310 (FourthCheck) is performed. Exemplary conditions of FourthCheck are provided in Table 4.

TABLE 4

| OPERAND 1 | Condition | OPERAND 2 |
|---|---|---|
| AbsPosHiRes | Less than or equal to | GainPoint0Prev |

When FourthCheck is TRUE, then GainPoint0 and GainPoint1 are set to AbsPosHiRes and (AbsPosHiRes−RevPosHys) at 320 and 330, respectively. When FourthCheck is FALSE, the previous GainPoint values are used at 320 and 330, respectively.

With reference back to FIG. 3, the state sub-module 78 receives as input the operation flag 84, and the state handwheel torque 70. Based on the inputs 70 and 84, the state sub-module performs methods to determine a gain filter constant 90; to determine an end of travel state 92; and to determine the damping factor 74.

Figure 6:
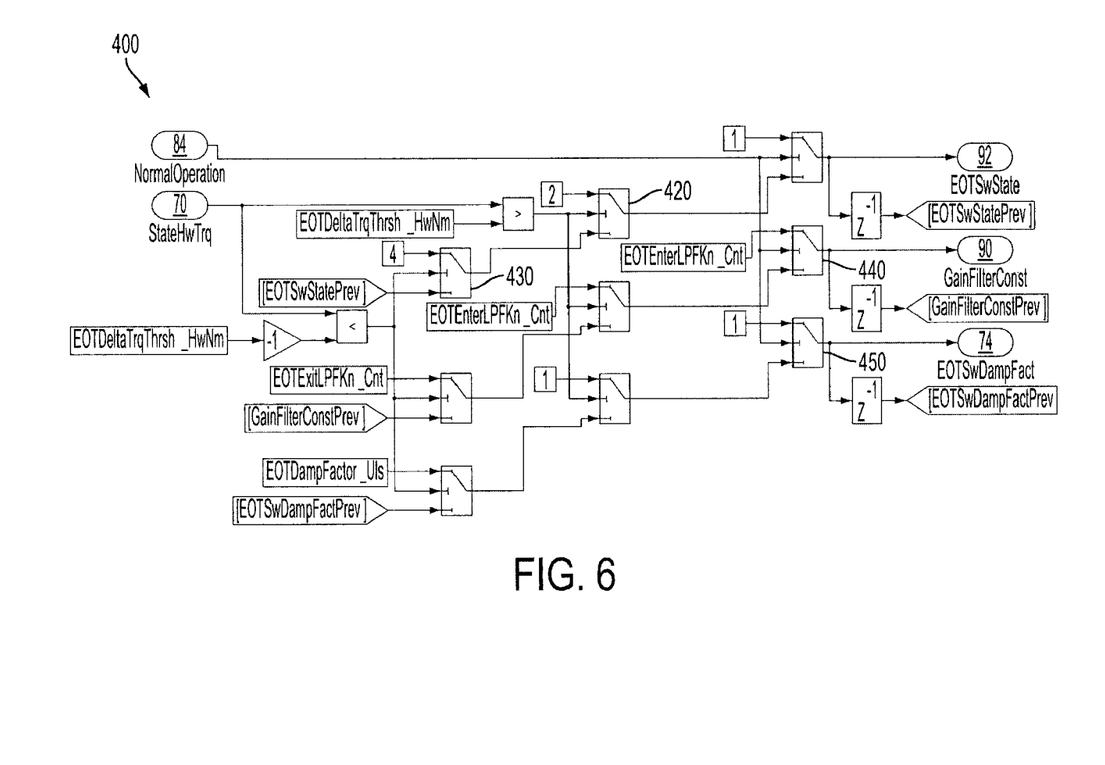

For example, exemplary embodiments of a method 400 that may be performed by the state sub-module 78 are shown in FIG. 6. In FIG. 6, the end of travel state 92 (EOTSwState) is set to a value of one (normal operation), two (enter state), three (hold state) or four (exit state). The EOTSwState is set to the value one when NormalOperation is TRUE or one at 410. The EOTSwState is set to the value two when NormalOperation is FALSE or zero, and the handwheel torque state 70 (StateHwTrq) is greater than a predetermined value (EOTDeltaTrqThrsh) at 420. The EOTSwState is set to four when NormalOperation is FALSE or zero and StateHwTrq is less than −EOTDeltaTrqThrsh at 430. When Normal Operation is FALSE or zero and StateHwTrq is within the range±EOTDeltaTrqThrsh, the previous state is used.

The same logic can be used for the calculation of the gain filter constant 90 (GainFilterConst) and the damping factor 74 (EOTSwDampFact). The GainFilterConst is used to specify a lowpass filter cutoff frequency that is applied to the gain. This frequency takes on the value EOTEnterLPFKn when entering (state two) and EOTExitLPFKn when exiting (state four) at 440. The EOTSwDampFact is used in a subsequent operation to provide different damping values for the enter and exit states. In this implementation, EOTSwDampFact is set to one when entering, and is switched to the predetermined value EOTDampFactor when exiting at 450. As can be appreciated, in other implementations the damping factor 74 is not used, rather, enter and exit damping can be predefined.

With reference back to FIG. 3, the final gain factor module 82 receives as input handwheel torque 68, the gain point P0 86, the gain point P1 88, the gain filter constant 90, and the end of travel state 92. Based on the inputs 68, 86-92, the final gain factor sub-module 82 performs methods to determine the gain 72.

Figure 7:
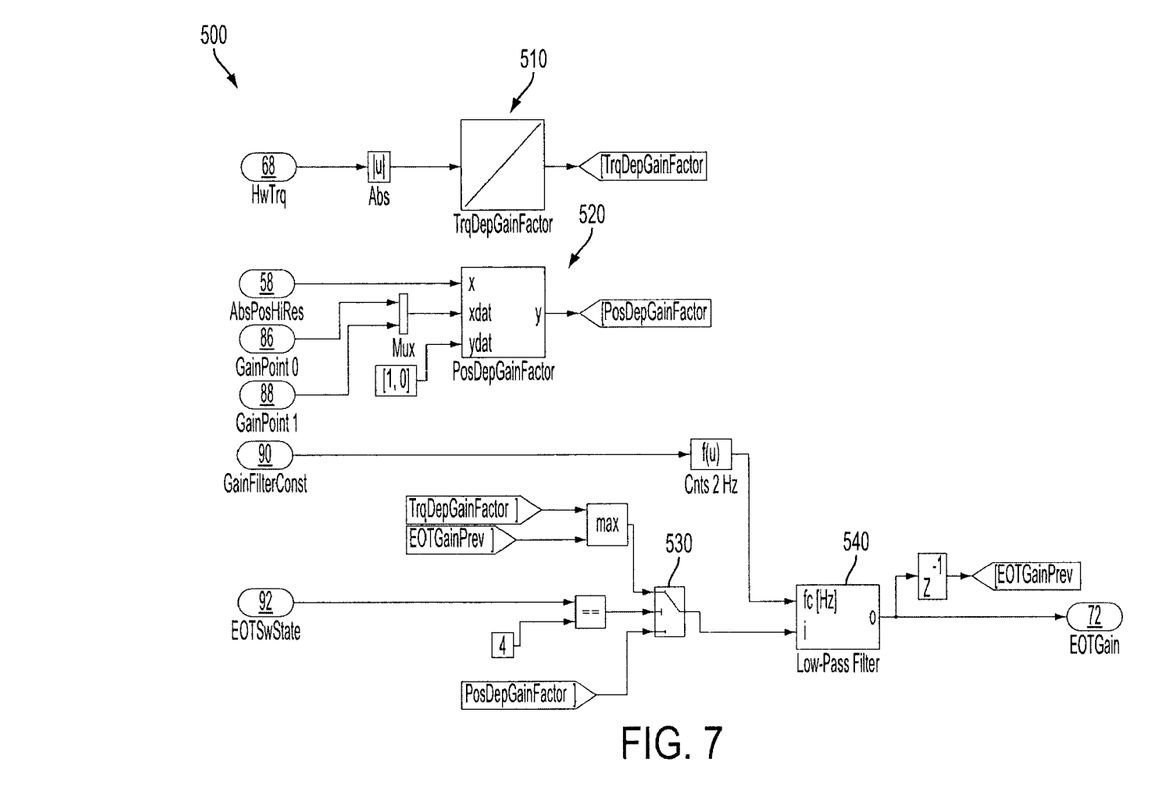

For example, as shown in the exemplary embodiments of a method 500 shown in FIG. 7, at 510, an upper lookup table is used to calculate a torque dependent gain factor (TrqDepGainFactor). Example values for the X table are [0, 0.5, 1]. Example values for the Y table are [0, 0.5, 1]. At 520, a dynamic lookup table is used to calculate a position dependent gain factor (PosDepGainFactor). The X table is defined as [GainPoint0, GainPoint1], and the Y table is [1, 0].

When EOTSwState is not four (i.e., one or two) PosDepGainFactor is used to determine the gain 72 at 530. The idea is that when entering the EOT region, the gain factor will transition from one to zero, thereby creating a soft stop function. When exiting the EOT region (i.e., EOTSwState is 4) TrqDepGainFactor is used to determine the gain 72 at 530. In this manner, the gain factor quickly transitions back to a value of one, nearly eliminating the sticky feel. In various embodiments, a lowpass filter is applied to the gain 72 at 540, where the frequency is determined by the gain filter constant 90 (GainFilterConst).

With reference back to FIG. 2, the damping determination module 54 receives as input motor velocity 94, the learned limits 62, 64, the damping factor 74, and the hand wheel position 58. Based on the inputs 58, 62, 64, 74, and 94, the damping determination module 54 performs methods to determine a damping 96.

Figure 8:
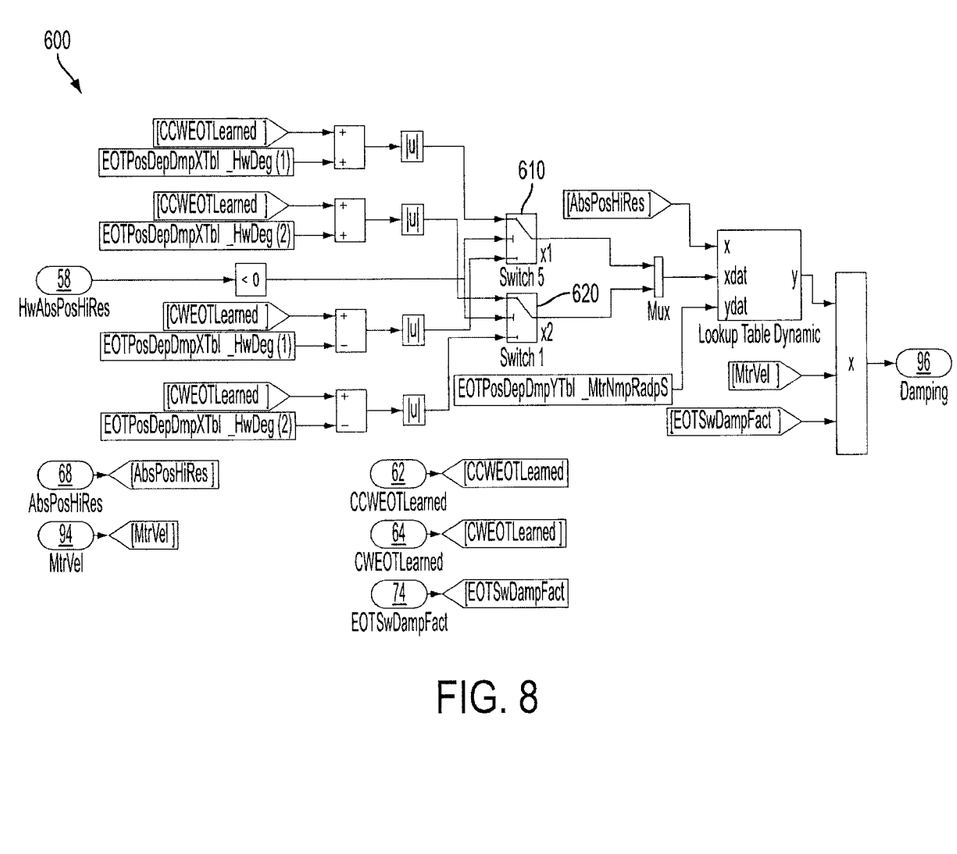

For example, FIG. 8 illustrates a damping method 600 that can be performed by the damping determination module 54 to determine the damping 96 in accordance with exemplary embodiments. The damping method 600 provides damping in the end of travel region to reduce steering wheel bounce. As can be appreciated, the damping determination can be performed similarly as described in US Patent Publications 2011/0010053 and 2011/0010049, which are incorporated herein by reference in their entirety.

In various embodiments, the damping values can be based on the learned EOT limits 62, 64 (CCWEOTLearned, CWEOTLearned), although other implementations based on EOT position could be used. In FIG. 8, X table values [X1, X2] are selected at 610 and 620. Y table values are set to predetermined values (EOTPosDepDmpYTb1) exemplary values include [0, 0.01]. Note that the output of the dynamic lookup table is used to scale the motor velocity 94 at 630. The damping factor 74 (EOTSwDampFact) provides an additional multiplier at 630. As previously noted, separate damping lookup Y tables can be used instead of the damping factor.

With reference back to FIG. 2, the final assist command determination module 56 receives as input the gain 72, the damping 96, and motor torque command 98. In various embodiments, the motor torque command 80 can be determined by other sub-modules within the control module 40. Based on the inputs 72, 96, and 98, the final assist command determination module 56 determines the final assist command 44. The final assist command determination module 56 applies the gain 72 and/or the damping 96 to the motor torque command 98 and generates the final assist command 44 based thereon. The final assist command 44 can be used to control the motor of the steering assist unit 18 (FIG. 1).

In one example, the final assist command determination module 56 applies the gain 72 to the motor torque command 98 to scale the motor torque command 98 near the end of travel region. In another example, the final assist command determination module 56 subtracts the damping 96 from the motor torque command 98. As can be appreciated, when both the gain 72 and the damping 96 are applied to the motor torque command 98, the damping 96 can be subtracted before or after the gain 72 is applied to the motor torque command 98.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for controlling a steering system, near an end of travel region, the control system comprising:
    a first module that determines a position dependent gain factor based on a hand wheel position, determines a torque dependent gain factor based on a hand wheel torque, determines an end of travel state of the hand wheel, selects one of the position dependent gain factor and the torque dependent gain factor based on the end of travel state, and estimates a command adjust value based on the selected gain factor; and
    a second module that generates a motor assist command based on the command adjust value to control the steering system.

2. The control system of claim 1, wherein the end of travel state is at least one of entering an end of travel region, exiting the end of travel region, outside of the end of travel region, and hold within the end of travel region.

3. The control system of claim 2, wherein the first module selects the position dependent gain factor when the end of travel state is at least one of the entering the end of travel region, and the outside of the end of travel region.

4. The control system of claim 2, wherein the first module selects the torque dependent gain factor when the end of travel state is the exiting the end of travel region.

5. A method of controlling a steering system near an end of travel region, the method comprising:
    determining a position dependent gain factor based on a hand wheel position;
    determining a torque dependent gain factor based on a hand wheel torque;
    determining an end of travel state of the hand wheel;
    selecting one of the position dependent gain factor and the torque dependent gain factor based on the end of travel state;
    estimating, by a module of a control system configured to control the steering system, a command adjust value based on the selected gain factor; and
    generating a motor assist command based on the command adjust value to control the steering system.

6. A method of controlling a steering system near an end of travel region, the method comprising:
    estimating, by a module of a control system configured to control the steering system, a command adjust value based on a hand wheel torque;
    determining a position dependent gain factor based on a hand wheel position;
    selectively setting the command adjust value based on the position dependent gain factor;
    generating a motor assist command based on the command adjust value to control the steering system; and
    reducing end of travel harshness by sending the motor assist command to the steering system,
    wherein the selectively setting the command adjust value is based on an end of travel state of the hand wheel.

7. The method of claim 6, wherein the end of travel state is at least one of entering an end of travel region, exiting the end of travel region, outside of the end of travel region, and hold within the end of travel region.

8. The method of claim 7, wherein the selectively setting the command adjust valued is based on the position dependent gain factor when the end of travel state is at least one of the entering the end of travel region, and the outside of the end of travel region.

9. A method of controlling a steering system near an end of travel region, the method comprising:
    estimating, by a module of a control system configured to control the steering system, a command adjust value based on a hand wheel torque;
    determining a torque dependent gain factor based on the hand wheel torque;
    selectively setting the command adjust valued based on the torque dependent gain factor;
    generating a motor assist command based on the command adjust value to control the steering system; and
    reducing end of travel harshness by sending the motor assist command to the steering system,
    wherein the selectively setting the command adjust value is based on an end of travel state of the hand wheel.

10. The method of claim 9, wherein the end of travel state is at least one of entering an end of travel region, exiting the end of travel region, outside of the end of travel region, and hold within the end of travel region.

11. The method of claim 10, wherein the selectively setting the command adjust valued is based on the torque dependent gain factor when the end of travel state is the exiting the end of travel region.

12. The method of claim 5, wherein the torque dependent gain factor is determined by looking up a lookup table using the hand wheel torque.

13. The method of claim 5 further comprising determining a damping based on a motor velocity, wherein the motor assist command is generated further based on the damping.

14. The control system of claim 1, wherein the first module looks up a lookup table using the hand wheel torque to determine the torque dependent gain factor.

15. The control system of claim 1 further comprising a third module that determines a damping based on a motor velocity.

16. The control system of claim 15, wherein the second module generates the motor assist command further based on the damping.

* * * * *